United States Patent
Shiue et al.

(10) Patent No.: US 6,579,327 B1
(45) Date of Patent: Jun. 17, 2003

(54) CYLINDRICAL HIGH VOLTAGE SUPERCAPACITOR AND METHOD OF MANUFACTURING THE SAME

(75) Inventors: Lih-Ren Shiue, Hsinchu (TW); Li-Ping Li, Taichung (TW); Hsing-Chen Chung, Hsinchu (TW); Wan-Ting Lo, Hsinchu (TW)

(73) Assignee: Luxon Energy Devices Corporation, Hsinchu (TW)

( * ) Notice: Subject to any disclaimer, the term of this patent is extended or adjusted under 35 U.S.C. 154(b) by 0 days.

(21) Appl. No.: 10/236,998

(22) Filed: Sep. 6, 2002

Related U.S. Application Data

(62) Division of application No. 10/072,388, filed on Feb. 7, 2002.

(51) Int. Cl.$^7$ ................................................ H01G 9/00
(52) U.S. Cl. ...................... 29/25.03; 361/503; 361/512
(58) Field of Search .............................. 29/25.01–25.03; 361/503–512, 517, 518, 511

(56) References Cited

U.S. PATENT DOCUMENTS

| | | | | |
|---|---|---|---|---|
| 5,450,279 A | * | 9/1995 | Yoshida et al. |
| 5,516,339 A | * | 5/1996 | Bailey |
| 5,973,912 A | * | 10/1999 | Kibi et al. |
| 6,187,061 B1 | * | 2/2001 | Amatucci et al. |
| 6,426,863 B1 | * | 7/2002 | Munshi |

* cited by examiner

Primary Examiner—Ha Tran Nguyen
(74) Attorney, Agent, or Firm—J.C. Patents

(57) ABSTRACT

A method of manufacturing a cylindrical high voltage supercapacitor. An anode and a cathode are provided. At least one bipolar electrode is interposed between the anode and the cathode, and a separator is intervened in each pair of the above electrodes. The anode, the cathode, the bipolar electrode and the separator, as placed in the above order, are wound concentrically into a roll, so as to form the cylindrical high voltage supercapacitor.

14 Claims, 3 Drawing Sheets

CYLINDRICAL HIGH VOLTAGE SUPERCAPACITOR AND METHOD OF MANUFACTURING THE SAME

CROSS-REFERENCE TO RELATED APPLICATION

This application is a divisional application of, and claims the priority benefit of, U.S. application Ser. No. 10/072,388 filed on Feb. 7, 2002.

SCENARIO OF THE INVENTION

1. Field of the Invention

The present invention relates in general to a cylindrical high voltage supercapacitor and a method of manufacturing the same. More particularly, the invention relates to a spirally wound cylindrical high voltage supercapacitor with at least one bipolar electrode interposed between an anode and a cathode, and a method of manufacturing the same.

2. Description of the Related Art

Batteries are always demanded for portable electronic devices, cordless power tools, uninterruptible power systems, and electric vehicles. There is a persistent trend that the batteries in the preceding applications should be compact, light, and high in energy-content. In order to meet these requirements, new electrode materials are explored and new cell designs are developed for batteries. Energy stored in batteries can be released in time periods from seconds to hours. When a long discharge time is needed, batteries require large energy densities that are generally achieved by storing a large amount of reactants in a given volume of electrodes of novel materials. In applications in need of a large current in a short discharge time, the loads will consume a peak power that can only be provided by batteries with high power densities. Power is the product of current density and cell operating voltage whereby the latter parameter is easier to maximize for attaining high power densities. The most efficient way for maximum operating voltage is a bipolar design that can produce a high voltage in a small cell volume. A large number of publications on enhancing the power density of lead-acid by using bipolar design have appeared in the literature, for example, U.S. Pat. Nos. 4,188,464; 4,539,268; 4,254,415; 5,729,891; 5,882,817; and 5,993,494, as well as the report by LaFollette and Bennion; "Design Fundamentals of High Power Density, Pulse Discharge, Lead Acid Batteries"; J. Electrochemist. Soc., Vol.137, No.12, December 1990; PP.3693–3707 are all on the subject, just to cite a few. Regardless of the endeavors by the battery industry, provision of peak power is preferably furnished by capacitors, particularly by supercapacitors, since the latter intrinsically have higher power densities than all batteries.

Supercapacitors are energy-storage devices that depend on surface adsorption, that is, electrostatic attraction, to accumulate charges up to thousands of farads (F) from surface oxidation-reduction. Because of the rapid physical process of adsorption and shallow accumulation of charges such as superficial reactions, supercapacitors intrinsically have much greater power densities than all batteries can accommodate. Batteries utilize slow chemical reactions that occur in the bulk of electrodes for energy storage, and the release of energy in batteries is equally slow. It is this charge-discharge mechanism that grants batteries with high energy densities, and supercapacitors with high power densities. In the development of the battery or supercapacitor, the goal is to improve the property where the device is deficient. As the energy stored in a supercapacitor is proportional to the square of its working voltage as described in equation (1), $$E = 1/2 CV^2 \tag{1}$$

where E is stored energy, C is capacitance, and V is working voltage, it is plausible to increase V to enhance the energy density of supercapacitors. In addition to choosing an appropriate electrolyte for augmenting V, for example, an aqueous electrolyte provides 1V while an organic system can provide as high as 3V of working voltage, the bipolar design as used for batteries may be applied to supercapacitors. As a matter of fact, many works have employed such design for attaining high V for supercapacitors as disclosed in U.S. Pat. Nos. 5,450,279; 5,646,815; 5,907,472; 5,930,108; 5,959,830; 5,993,494; 6,187,061; 6,304,426; 6,306,270; and 6,320,740, as well as in Japanese Pat. No. JP-A-6-5467. Just like their bipolar battery analogy, the supercapacitors in the previously cited references are all composed of a stack of bipolar electrodes separated by ionically conductive separators in a hermetically sealed package.

However, it is labor-intensive and costly to pile up layers of electrodes, separators, and sealing gaskets in sequence and in multiple repetitions to form the stacked bipolar supercapacitors. Furthermore, the resulted devices will be bulky and can only be in a rectangular or a square shape, which will deny the use of the devices in applications that are limited in space and configuration.

In the prior art, the working voltage for cylindrical supercapacitors ranged between 2.3V to 2.5V, while most integrated circuits (IC's) require an operation voltage between 3V to 5.5V. To support operation of an integrated circuit, at least two low voltage supercapacitors connected in series are required. For a printed circuit board (PCB) that requires high capacitance, the capacitor that provides large capacitance and typically occupies a large area such as an aluminum electrolyte capacitor is used. It is thus difficult to miniaturize the printed circuit board.

SUMMARY OF THE INVENTION

Accordingly, the present invention provides a cylindrical high voltage supercapacitor and a method of manufacturing the same, which employs a spirally winding method. Therefore, the cylindrical high voltage supercapacitor can be fabricated in a simple process.

The present invention further provides a cylindrical high voltage supercapacitor and a method of manufacturing the same, where the cylindrical high voltage supercapacitor can be formed in a compact volume with a high volume efficiency.

The cylindrical high voltage supercapacitor and the method for manufacturing the same provided by the present invention have reduced number and volume of components, as required by a printed circuit board.

In addition, the cylindrical high voltage supercapacitor provided by the present invention can be connected in parallel for power applications.

The cylindrical high voltage supercapacitor provided by the present invention comprises an anode, a cathode, at least one bipolar electrode and at least one separator. The bipolar electrode is interposed between the anode and the cathode. The separator is intervened between two neighboring electrodes. The above anode, cathode, bipolar electrode and separator are wound together to form a spirally wound concentric roll.

The method of manufacturing a cylindrical high voltage supercapacitor provided by the present invention comprises the following steps. An anode and a cathode are provided. At least a bipolar electrode is interposed between the anode and the cathode. Between each pair of electrodes, a separator is intervened. According to the above-mentioned order, the anode, the cathode, the bipolar and the separator are spirally wound as a roll to form the cylindrical high voltage supercapacitor.

The present invention interposes at least one bipolar electrode between the anode and the cathode and applies a spirally winding process to replace the stacking process. Therefore, the cylindrical high voltage supercapacitor is made in a less laborious process, and is thus more advantageous for automation.

The spiral winding process provides more electrode area with less material in each cell. From the aspect of custom-built shape, the cylindrical shape is more easily modified compared to a rectangle or square. The cylindrical high voltage supercapacitor has a smaller volume and a better volume efficiency.

The voltage of the cylindrical high voltage supercapacitor increases with the number of the bipolar electrodes. Therefore, by increasing the number of the bipolar electrodes, the working voltage thereof can be increased as required.

Further, by increasing the working voltage, a cylindrical high voltage supercapacitor is used to replace two serially connected low voltage supercapacitors. A higher energy density is thus obtained. The traditional large volume component such as aluminum electrolyte capacitor can be replaced to reduce the chip counts of a printed circuit board, which can thus be miniaturized.

In addition, having sufficient working voltage allows the capacitors to be connected in parallel. While being connected in parallel, the total resistance of a module is equal to the resistance of a single component divided by the number of the supercapacitors in the module (assuming that the resistance for each component is the same). The module thus has more power than each component. Further, when one component of the module fails, the module can still operate properly. On the contrary, the serial module stops working when any of the components fails. Therefore, the parallel module is more reliable than the serial module.

Both the foregoing general description and the following detailed description are exemplary and explanatory only and are not restrictive of the invention, as claimed.

DESCRIPTION OF THE PREFERRED EMBODIMENTS

Supercapacitors are energy-storage devices that utilize electrostatic attraction for accumulating charges on surfaces of polarizable electrodes. The electrodes contain carbon or metal oxide for site adsorbing, which is known as the active material. In terms of electrical characteristics such as capacitance and charging/discharging rate, the supercapacitor is synonymous to the electric double layer capacitor (EDLC) and the ultracapacitor.

Some schools of thought consider EDLC to be reserved for supercapacitors incorporating carbon as the active material, and ultracapacitor for the capacitor using metal oxide as the active material. The latter may also utilize surface redox reactions or the so-called pseudocapacitance to store energy. Regardless of the title given to the devices, charges up to thousands of farads can be stored, and peak currents up to hundreds of amperes delivered.

Conventionally, a cylindrical supercapacitor is formed by concentrically winding two electrodes and two separators, while each electrode is accompanied with one separator. The electrodes are formed by coating the same active material on a conductive material or a current collector. The polarity of the electrodes is artificially assigned during manufacturing. Neither the current collector nor the active material of the supercapacitor has a high breakdown strength. The working voltage of the supercapacitor is actually the decomposition voltage of the electrolyte used therein. Depending on the electrolyte, the supercapacitor has a rated voltage of 1.0V or 2.5V if an aqueous electrolyte or an organic electrolyte is used, respectively. When the supercapacitor is charged to about 10% higher than the rated voltage, deposition of the electrolyte and catastrophe may occur. Application of the 2.5V supercapacitor is rather inconvenient because multiple numbers of capacitors are often required, and the control circuit for assembly is complex and costly. Obviously, the working voltage of the supercapacitor has to be maximized for ease of use in order to take advantage of and expand the scope of its applications. Among currently feasible approaches, the bipolar design is the most effective way to increase the working voltage of the supercapacitor.

Equation (2) describes the relationship between working voltages of bipolar and monopolar supercapacitors with the same electrolyte $$V_{bs}=(n+1)V_{ms} \qquad (2)$$

where $V_{bs}$ and $V_{ms}$ are working voltages for bipolar and monopolar supercapacitors, respectively, and n is the number of bipolar electrodes in the spirally wound roll of capacitor. The voltage of the supercapacitor is increased with the number of the bipolar electrodes. For example, if the capacitor comprises only one bipolar electrode, the voltage of the bipolar design is double of that of the monopolar design using the same electrolyte. If two bipolar electrodes are used, the voltage of the, bipolar design is three times of that of the monopolar design.

Figure 1:
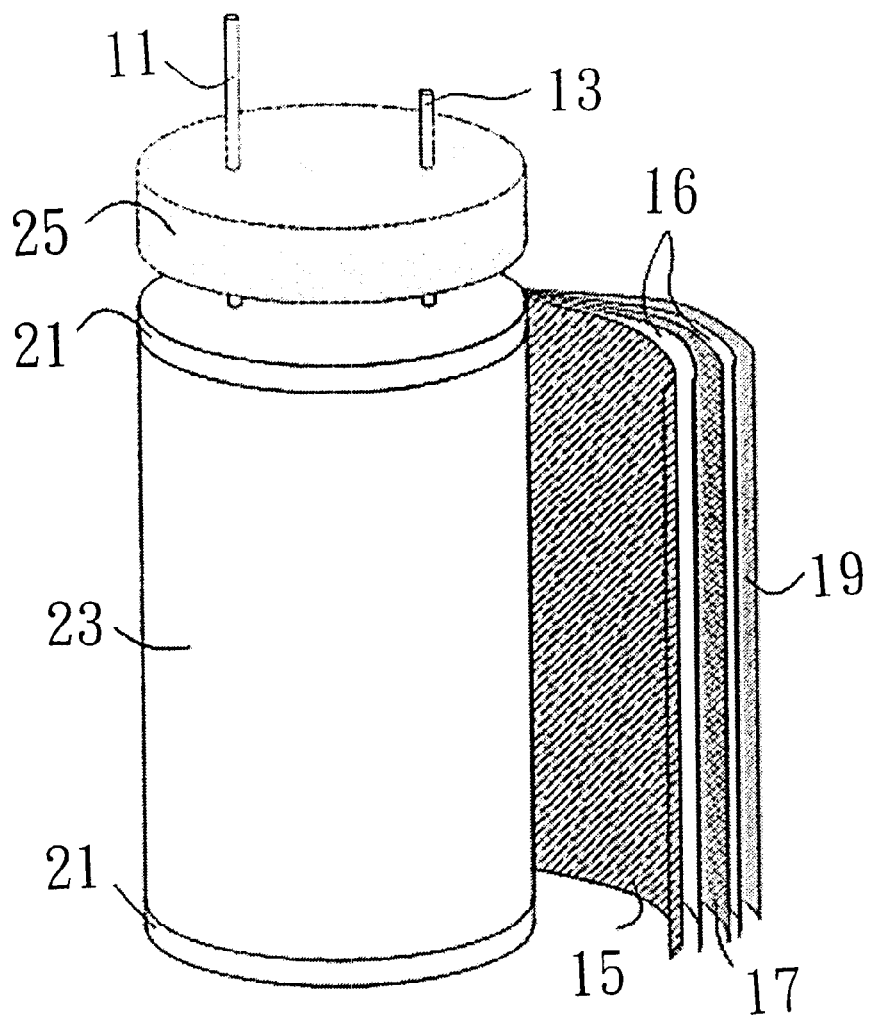
FIG. 1 is an exploded view of a cylindrical bipolar supercapacitor that comprises three sheets of electrodes and two sheets of separator wherein a bipolar electrode is interposed between an anode and a cathode with one separator interposed between every two electrodes. The separators are used to separate the electrodes and to contain an electrolyte for the supercapacitor.

FIG. 1 shows the cylindrical high voltage supercapacitor and the method for manufacturing the same according to one embodiment of the present invention. In FIG. 1, a cylindrical bipolar supercapacitor 10 comprising three layers of electrodes 15, 17 and 19 and two separators 16 for separating each of the pairs 15, 17 and 17, 19 thereof is shown. The electrodes 15 and 19 are monopolar, that is, only one side of a current collector is coated with active material. The current collector is selected from a metallic foil such as an aluminum foil, a copper foil, a titanium foil or a nickel foil. The blank side of the current collector which is not coated with active material is insulated by fluorinated polymers, epoxy, acrylics, urethanes or silicones. By electrically insulating the blank side of the monopolar electrodes 15 and 19, additional separators thereon are not required. The less the separators used in a capacitor, the less quantity of the electrolyte is required. Where organic electrolyte is used in the supercapacitor, as the electrolyte is generally the most costly component, the reduced quantity of the electrolytemeans that the cost of the capacitor is lowered.

The method for manufacturing the bipolar electrode 17 is similar to that for manufacturing the monopolar electrodes 15 and 19. However, both sides of the current collector for the bipolar electrode 17 are coated with active material. The active material includes $Fe_3O_4$, $SnO_2$, $MnO_2$ or $PbO_2$. Further, the method for securing the active material on the current collector includes roller coating, dip coating, power coating, electrophoretic deposition, or sputtering.

After the electrodes are fabricated, the bipolar electrode 17 is interposed between the monopolar electrodes 15 and 19. One separator 16 is placed between the electrodes 15 and 17, and the electrodes 17 and 19. The monopolar electrodes 15 and 19, the bipolar electrode 17, and the separators 16 are spirally wound into a roll 23. Electric leads 11 and 13 are spot welded to the electrodes 15 and 19, respectively, while no electric lead is welded to the bipolar electrode 17.

When the separators 16 are adsorbing electrolyte, the electrodes 15, 17 and 19 are connected in series, which is equivalent to two spiral sub-cells connected in series without introduction of any inter-cell connector. As the bipolar supercapacitor 10 has two identical sub-cells, with one formed by the electrodes 15, 17 and the separator 16 placed in between and the other one formed by the electrodes 17, 19 and the separator 16 placed in between, the working voltage of the supercapacitor doubles the working voltage of each sub-cell. By increasing the number of the bipolar electrodes, the working voltage for the multiple electrodes device is determined according to Equation (2). The electrolyte includes aqueous electrolyte selected from $H_2SO_4$, KOH, $Na_2SO_4$, and a chemical of the mixture thereof. Alternatively, an organic electrolyte such as an organic solution with a quaternary ammonium salt containing $BF_4^-$ as anion in an organic solvent selected from acetonitrile, methyl carbonate, ethylene carbonate, propylene carbonate, or a mixture thereof can be incorporated.

For the bipolar design to be effective, the electrolyte has to stay within each sub-cell. Once the electrode and the separator are wound into a roll as the capacitor 10, one end of the roll is sealed with an elastic adhesive 21 but leaving the other end of the roll open for adsorbing an electrolyte. The elastic adhesive 21 is selected from butyl rubber, epoxy, acrylics, urethanes or silicones. When a sufficient amount of electrolyte is adsorbed by the separators with the assistance of vacuum, the open end of the roll is sealed to eliminate electrolyte creep between sub-cells. With the leads 11 and 13 inserted through a sealing cap 25, the whole assembly is placed in an aluminum can, which is not shown in FIG. 1, to complete the encapsulation of the supercapacitor. Cylindrical supercapacitors containing one or more bipolar electrodes can be manufactured according to the disclosure described above. Further, the working voltage of the supercapacitor can be tuned to the desired level by using an adequate number of bipolar electrodes and a suitable electrolyte system. Thereby, a cylindrical high voltage supercapacitor with a working voltage higher than 5.0V and a capacitance larger than 0.1 F can be obtained.

The following two examples are only given to demonstrate, rather than limiting, the construction of cylindrical high voltage supercapacitors, and advantages of parallel connection of such capacitors.

EXAMPLE 1

Two cylindrical monopolar supercapacitors C1 and C2 are prepared using roller coating and concentric winding under the following conditions:

Electrode Composition: 40 g of composite power, that is, $Fe_3O_4/C$ as active material; 2 g of polyvinylidene fluoride (PVDF) as a binder; and 120 ml of N-methyl-2-pyrrolidone (NMP) as solvent to form a homogeneous paste for roller coating.

Current Collector: 20–80 μm aluminum foil.

Geometric Area of Electrode: about 150 $cm^2$.

Separator: 50–100 mil polypropylene (PP).

Electrolyte: 1M tetraethylammonium tetrafluoroborate in propylene carbonate.

Table 1

Electrical Characteristics of Two 2.5V supercapacitors C1 and C2, and the serial connection thereof (C1+C2)

| Supercapacitors | Capacitance (F) at Different Rates | | | $ESR^a$ | $LC^b$ |
| --- | --- | --- | --- | --- | --- |
|  | 0.1 A | 0.5 A | 1 A | (mΩ) | (mA) |
| C1 | 60.8 | 49.7 | 38.8 | 27.2 | 35.7 |
| C2 | 42 | 40 | 28 | 31.5 | 34.4 |
| C1 + C2 (1.8 V + 2.2 V)$^c$ | 27.2 | 24 | 18.4 | 57.9 | 33.5 |

$^a$ESR = equivalent series resistance
$^b$LC = Leakage Current
$^c$(C1 + C2) is charged up to 4.0 V, while the individual voltage is measured by a voltmeter.

Figure 2:
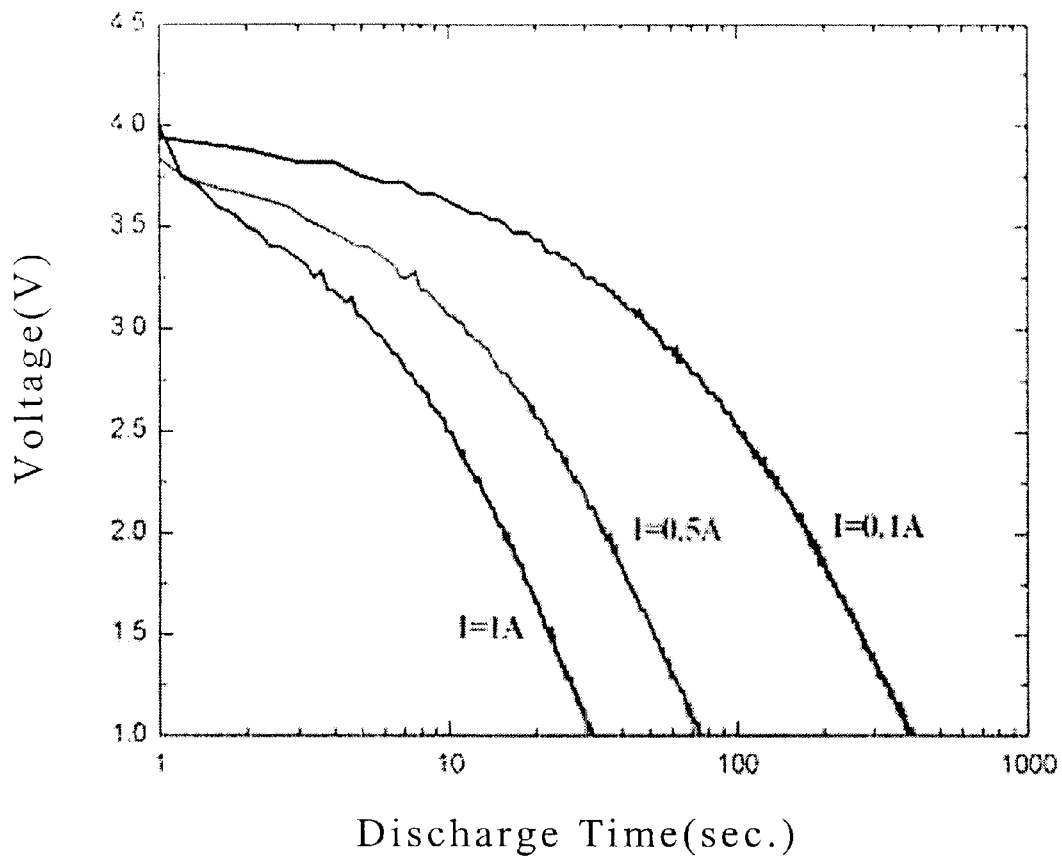
FIG. 2 shows galvanostatic discharge for two regular cylindrical supercapacitors connected in series, wherein each supercapacitor has a working voltage of about 2.5V, and the serially connected module is precharged to 4.0V.

When C1 and C2 are connected in series, that is, C1+C2, ESR of the module is the sum of C1 and C2, while the capacitance of the module under different discharge rates is smaller than either C1 or C2, or the module has half the capacitance of C1 as shown in Table 1. Though C1+C2 should produce a working voltage of 5.0V, the module is only charged to 4.0V so that neither C1 nor C2 will be overcharged. FIG. 2 depicts the galvanostatic discharge of C1+C2 at three different rates, where the module is charged to 4.0V prior to discharge.

EXAMPLE 2

Two 5.0V cylindrical supercapacitors C3 and C4 are prepared with the bipolar design is shown in FIG. 1, under the same conditions as Example 1, except that in this example, three electrodes, two monopolar and one bipolar, and an electrode area of about 40 $cm^2$ are incorporated. Table 2 shows the electrical characteristics of the capacitors C3, C4 and a module in which the capacitors C3 and C4 are connected in parallel.

TABLE 2

Electrical Characteristics of Two 5.0 V supercapacitors C3 and C4, and the parallel connection thereof C3//C4

| Supercapacitor | Capacitance (F) at Different Rates | | | ESR | LC |
| --- | --- | --- | --- | --- | --- |
|  | 0.1 A | 0.5 A | 1 A | (mΩ) | (mA) |
| C3 | 4.0 | 3.4 | 3.1 | 267 | 27.9 |
| C4 | 4.4 | 4.3 | 4.1 | 351 | 80 |
| C3//C4 | 8.2 | 7.8 | 6.6 | 146 | 81.4 |

Figure 3:
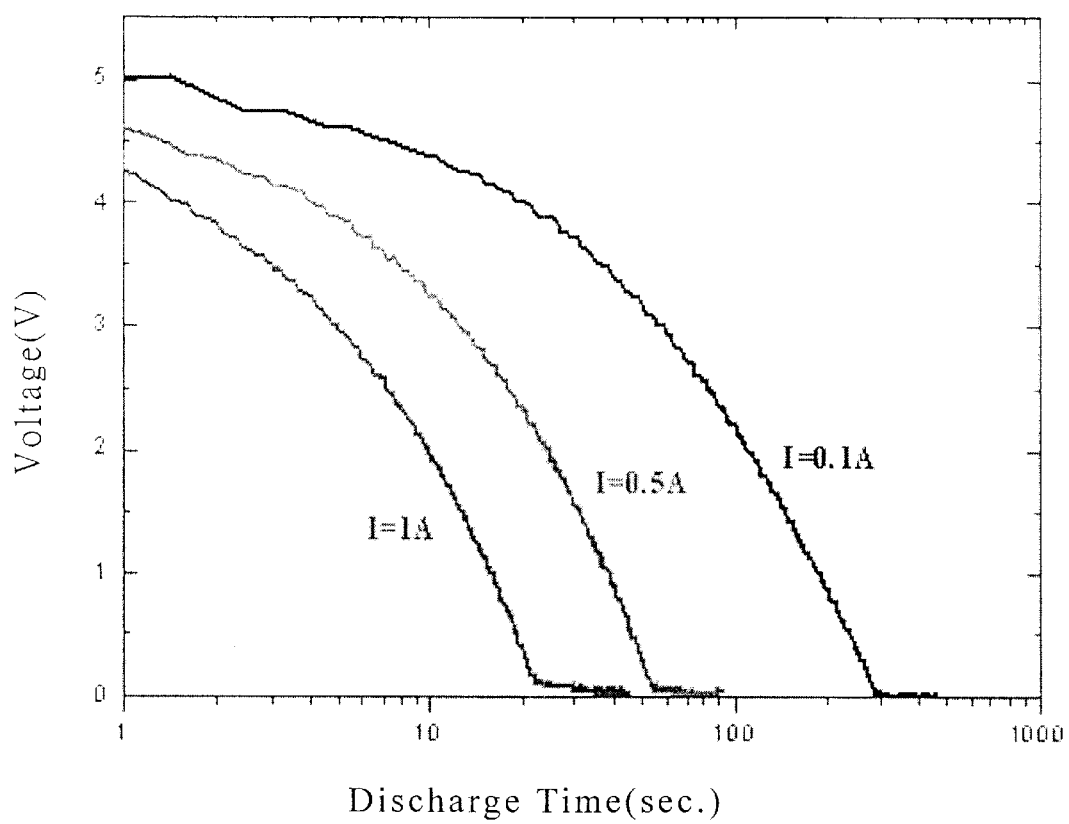
FIG. 3 shows galvanostatic discharge for two bipolar cylindrical supercapacitors connected in parallel, wherein each supercapacitor has a working voltage of about 5.0V, and the parallel-connected module is precharged to 5.0V.

Since C3 and C4 have less than ⅓ the electrode areas of C1 and C2, and the former has a higher ESR, the capacitance of the capacitors C3 and C4 is much smaller than C1 and C2. As shown in Table 2, when C3 and C4 are parallel connected, that is, C3//C4, the capacitance of the module is equal to the sum of C3 and C4, while the ESR is about one half of C3 or C4. Different from Example 1 where the module of (C1+C2) is charged to 4.0V as a precaution, the parallel module (C3//C4) can be safely charged to 5.0V, 1.0V of increment, so that the module C3//C4 has more applications. FIG. 3 shows galvanostatic discharge at three different rates after charging the module C3//C4 to 5.0V.

Comparing FIGS. 2 and 3, it can be seen that similar use life results for the parallel module and the serial module with a discharge cutoff voltage of 3.0V. However, the capacitance of the component in the parallel module is far less than that in the serial module. That is, the parallel module of the cylindrical bipolar supercapacitors provided by the present invention has a similar use time with a smaller electrode area and a smaller capacitance compared to the conventional serial module of the cylindrical monopolar supercapacitors.

According to the above, the present invention has the following advantages.

1. The cylindrical high voltage supercapacitor in the present invention is formed by spiral winding instead of vertical stacking. As the spiral winding is simpler and more advantageous for automation, the cylindrical high voltage supercapacitor is easily manufactured.

2. The spiral winding process provides more equivalent electrode area in a one unit cell with less material compared to the stacking process. In terms of custom-built shape, the cylinder is more easily modified compared to the rectangle and square. Therefore, an improved volume efficiency is obtained.

3. The voltage of the cylindrical supercapacitor increases with the number of the bipolar electrodes. Therefore, by increasing the number of bipolar electrodes, the working voltage of the cylindrical supercapacitor is increased.

4. When more bipolar electrodes are required to boost the voltage, the latter added bipolar electrodes have to be disposed behind the bipolar electrode which has been installed. Therefore, all of the bipolar electrodes are disposed between the anode and the cathode, and all of the electrodes are serially connected in a roll, so that an internal connector is not required.

5. As the working voltage of the cylindrical supercapacitor can be increased, a cylindrical supercapacitor can be used to replace two low voltage supercapacitors connected in series. Further, the high energy density allows the cylindrical high voltage supercapacitor to replace the large volume traditional components such as aluminum electrolyte capacitor. Therefore, the chip count for a printed circuit board is reduced, and it is easier to miniaturize.

6. Having sufficient working voltage, the capacitors can be used in a parallel connection. During the parallel connection, the total resistance is equal to the resistance of a single component divided by the number of supercapacitors for forming the module (assuming that resistance for each supercapacitors is identical). Therefore, the module is more powerful than each single component. Further, when one component of the parallel module is out of order, the module still operates normally. On the contrary, when any component of a serially connected module fails, the whole serial module stops operating normally. The parallel module is thus more reliable than the serial module.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. A method for manufacturing a cylindrical high voltage supercapacitor, comprising:

providing an anode and a cathode;

interposing at least one bipolar electrode between the anode and the cathode;

placing one separator between each pair of electrodes, including the anode, the cathode and the bipolar electrode;

providing a roll;

concentrically and spirally winding the anode, the cathode, the bipolar electrode and the separators into the roll;

sealing one end of the roll; and absorbing electrolyte from an open end of the roll.

2. The method according to claim 1, wherein the step of providing the anode and the cathode as well as the step of interposing the bipolar electrode include providing current collectors selected from the group consisting of aluminum foils, copper foils, titanium foils and nickel foils.

3. The method according to claim 1, wherein the step of providing the anode and the cathode further comprising coating one side of each with active material.

4. The method according to claim 3, wherein the step of coating one side of each with active material comprises coating one side of each of the anode and the cathode by activated carbon coated with a metallic oxide selected from the group consisting of $Fe_3O_4$, $SnO_2$, $MnO_2$, or $PbO_2$.

5. The method according to claim 3, further comprising providing the anode and the cathode with the other side coated with insulating material.

6. The method according to claim 5, further comprising selecting the insulating material from the group consisting of fluorinated polymers, epoxy, acrylics, urethanes and silicones.

7. The method according to claim 1, wherein the step of interposing the bipolar electrode further comprises coating an active material on both sides thereof.

8. The method according to claim 7, further comprising coating an active carbonate coated with a metallic oxide selected from the group consisting of $Fe_3O_4$, $SnO_2$, $MnO_2$, and $PbO_2$ as the active material.

9. The method according to claim 1, further comprising providing an electrolyte to store energy.

10. The method according to claim 9, further comprising providing an aqueous electrolyte selected from the group consisting of $H_2SO_4$ solution, KOH-solution; $Na_2SO_4$ solution, and a mixture thereof as the electrolyte.

11. The method according to claim 10, further comprising providing an organic solution with a quaternary ammonium salt containing $BF_4^-$ as anion in an organic solvent selected from the group consisting of acetonitrile, dimethylcarbonate, ethylene carbonate, propylene carbonate and a mixture thereof.

12. The method according to claim 1, further comprising capping two ends of the roll with a material for sealing the roll, and the material is selected from butyl rubber, epoxy, acrylic, urethane and silicone.

13. The method according to claim 1, wherein the supecapacitor is operated at a working voltage greater than or equal to 5.0V and a capacitance greater than or equal to 0.1 F.

14. The method according to claim 1, further comprising forming the anode, the cathode and the bipolar electrode using roller coating, dip coating, power coating, electrophoretic deposition and sputtering.

* * * * *